United States Patent
Salako et al.

(10) Patent No.: US 12,534,096 B2
(45) Date of Patent: Jan. 27, 2026

(54) METHODS AND SYSTEMS AND NON-TRANSITORY COMPUTERS FOR MONITORING DRIVING BEHAVIOR OF A VEHICLE

(71) Applicant: Toyota Connected North America, Inc., Plano, TX (US)

(72) Inventors: Olarinre Salako, Little Elm, TX (US); Daniel Holman, Allen, TX (US); Sara Collins, Plano, TX (US); Danny Bargas, Coppell, TX (US); Shravanthi Denthumdas, Frisco, TX (US); Jennifer Lerman, Dallas, TX (US)

(73) Assignee: Toyota Connected North America, Inc., Plano, TX (US)

( * ) Notice: Subject to any disclaimer, the term of this patent is extended or adjusted under 35 U.S.C. 154(b) by 302 days.

(21) Appl. No.: 17/893,833

(22) Filed: Aug. 23, 2022

(65) Prior Publication Data
US 2024/0067196 A1 Feb. 29, 2024

(51) Int. Cl.
| | | |
|---|---|---|
| B60W 50/00 | (2006.01) | |
| B60W 50/12 | (2012.01) | |
| B60W 50/14 | (2020.01) | |
| G07C 5/00 | (2006.01) | |
| G07C 5/08 | (2006.01) | |

(52) U.S. Cl.
CPC ............ B60W 50/12 (2013.01); B60W 50/14 (2013.01); G07C 5/008 (2013.01); G07C 5/0825 (2013.01);
(Continued)

(58) Field of Classification Search
CPC ................ B60W 50/12; B60W 50/14; B60W 2540/043; B60W 2556/10;
(Continued)

(56) References Cited

U.S. PATENT DOCUMENTS 5,900,819 A * 5/1999 Kyrtsos .................. G08B 21/06
340/576
8,201,437 B2 6/2012 Takata
(Continued)

FOREIGN PATENT DOCUMENTS

| CN | 207082154 U | 3/2018 |
|---|---|---|
| CN | 110718063 A | 1/2020 |

(Continued)

OTHER PUBLICATIONS

Koneti Sandeep, et al., "Novel Drunken Driving Detection and Prevention Models Using Internet of Things," International Conference on Recent Trends in Electrical, Electronics and Computing Technologies (ICRTEECT), Jul. 2017, pp. 145-149.

Primary Examiner — Truc M Do
(74) Attorney, Agent, or Firm — Dinsmore & Shohl LLP

(57) ABSTRACT

A method for monitoring driving behavior of a vehicle includes obtaining first information including values related to driving operations of a vehicle based on sensors and obtaining a geographical location or a vehicle type of the vehicle. The method also includes extracting second information including values related to operations of vehicles associated with the vehicle type of the vehicle or the geographical location of the vehicle and determining whether there is a difference between the first information and the second information. The method further includes instructing the vehicle to adjust driving operations in response to determining that there is the difference between the first information and the second information.

18 Claims, 6 Drawing Sheets

(52) U.S. Cl.
CPC . *B60W 2510/182* (2013.01); *B60W 2540/043* (2020.02); *B60W 2540/10* (2013.01); *B60W 2540/12* (2013.01); *B60W 2540/30* (2013.01); *B60W 2556/10* (2020.02); *B60W 2720/106* (2013.01)

(58) Field of Classification Search
CPC ....... B60W 2510/182; B60W 2540/10; B60W 2540/12; B60W 2540/30; B60W 2720/106; G07C 5/008; G07C 5/0825
See application file for complete search history.

(56) References Cited

U.S. PATENT DOCUMENTS

| | | | |
|---|---|---|---|
| 10,703,379 B1 * | 7/2020 | Harvey | B60W 40/09 |
| 11,072,345 B2 | 7/2021 | Bowers et al. | |
| 11,146,929 B2 | 10/2021 | Taylor et al. | |
| 11,161,519 B2 | 11/2021 | Phillips et al. | |
| 2011/0210867 A1 | 9/2011 | Benedikt | |
| 2019/0126935 A1 * | 5/2019 | Phillips | G07C 5/0808 |
| 2019/0217865 A1 | 7/2019 | Nothacker et al. | |
| 2019/0329787 A1 * | 10/2019 | Hayashi | G06V 40/172 |
| 2020/0207358 A1 * | 7/2020 | Katz | G02B 27/0093 |
| 2022/0009503 A1 | 1/2022 | An et al. | |
| 2022/0153302 A1 * | 5/2022 | Arechiga-Gonzalez | B60W 50/14 |
| 2022/0375348 A1 * | 11/2022 | Ucar | G08G 1/0133 |

FOREIGN PATENT DOCUMENTS

| | | | | |
|---|---|---|---|---|
| CN | 112633580 A | * | 4/2021 | |
| TW | 201010889 A | * | 3/2010 | G07C 5/008 |

\* cited by examiner

METHODS AND SYSTEMS AND NON-TRANSITORY COMPUTERS FOR MONITORING DRIVING BEHAVIOR OF A VEHICLE

TECHNICAL FIELD

The present disclosure relates to systems and methods and non-transitory computers for detecting objects, and more particularly, to methods and systems and non-transitory computers for monitoring driving behavior of a vehicle and identifying drunk drivers.

BACKGROUND

Drunk driving can lead to tragic accidents. Despite the law against drunk driving, drunk driving behavior persists in our society. Therefore, there is a need for methods and systems and non-transitory computers for monitoring driving behavior of a vehicle.

SUMMARY

According to one embodiment of the present disclosure, a method may include obtaining first information including values related to driving operations of a vehicle based on sensors, obtaining a geographical location or a vehicle type of the vehicle, extracting second information including values related to driving operations of vehicles associated with the vehicle type of the vehicle or the geographical location of the vehicle, determining whether there is a difference between the first information and the second information, and instructing the vehicle to adjust driving operations in response to determining that there is a difference between the first information and the second information.

According to another embodiment of the present disclosure, a system includes a controller configured to obtain first information including values related to driving operations of a vehicle based on sensors, obtain a geographical location or a vehicle type of the vehicle, extract second information including values related to operations of vehicles associated with the vehicle type of the vehicle or the geographical location of the vehicle, determine whether there is a difference between the first information and the second information, and report to a third party in response to determining that there is a difference between the first information and the second information.

According to another embodiment of the present disclosure, a processor is programmed to obtain first information including values related to driving operations of a vehicle based on sensors, obtain a geographical location or a vehicle type of the vehicle, extract second information including values related to operations of vehicles associated with the vehicle type of the vehicle or the geographical location of the vehicle, determine whether there is a difference between the first information and the second information, and instruct the vehicle to adjust driving operations in response to determining that there is a difference between the first information and the second information.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
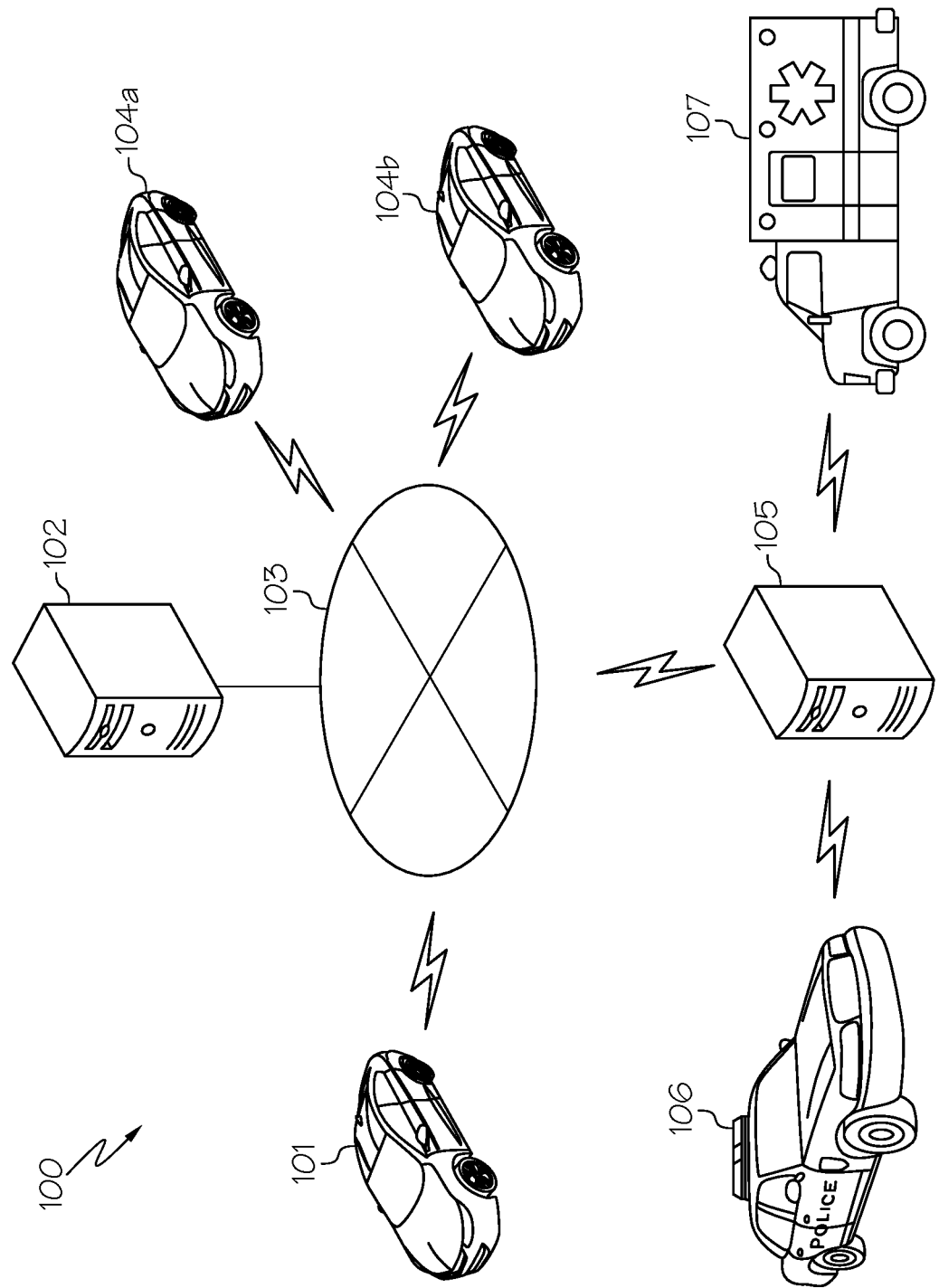
FIG. 1 depicts an example system for monitoring driving behavior of a vehicle, according to one or more embodiments shown and described herein.

Referring now to FIG. 1, an example system 100 for monitoring driving behavior of a vehicle is depicted, according to some embodiments. The system 100 may include a vehicle 101, other vehicles 104a and 104b, a first server 102, a second server 105, a police vehicle 106, and an ambulance 107. The vehicle 101, the other vehicles 104a and 104b, the first server 102, and the second server 105 may be connected via varying forms of communication methods 103 (For example, internet lines, telephone lines, etc.).

The vehicle 101 is a vehicle that may contain one or more driving assist components (e.g., autonomous driving, CACC, etc.) and may establish wireless connectivity with the first server 102. The other vehicles 104a and 104b may establish wireless connectivity with the first server 102. The vehicle 101 and the other vehicles 104a and 104b may be unrelated to each other. That is, the owners and/or drivers of the vehicle 101 and the other vehicles 104a and 104b may not know each other or plan ahead to initiate communication. The number of other vehicles may be more than three.

The first server 102 may be a computing device that may be positioned remotely from any roads and/or vehicles. The first server 102 may be a moving server, such as another vehicle, a cloud-based server, or any other type of computing device. As illustrated, the first server 102 is a cloud-based server. The first server 102 may be communicatively coupled to the vehicle 101, the other vehicles 104a and 104b, and the second server 105 via wireless connectivity. In some embodiments, the first server 102 may be a local server including, but not limited to, a roadside unit, an edge server, and the like.

The second server 105 may be a computing device that may be positioned remotely from any roads and/or vehicles. The second server 105 may be a moving server, such as another vehicle, a cloud-based server, or any other type of computing device. As illustrated, the second server 105 is a cloud-based server. The second server 105 may be communicatively coupled to the first server 102, the police vehicle 106, and the ambulance 107 via wireless connectivity. In some embodiments, the second server 105 may be a local server including, but not limited to, a roadside unit, an edge server, and the like. In some embodiments, the first server 102 and the second server 105 may be the same server.

Figure 2:
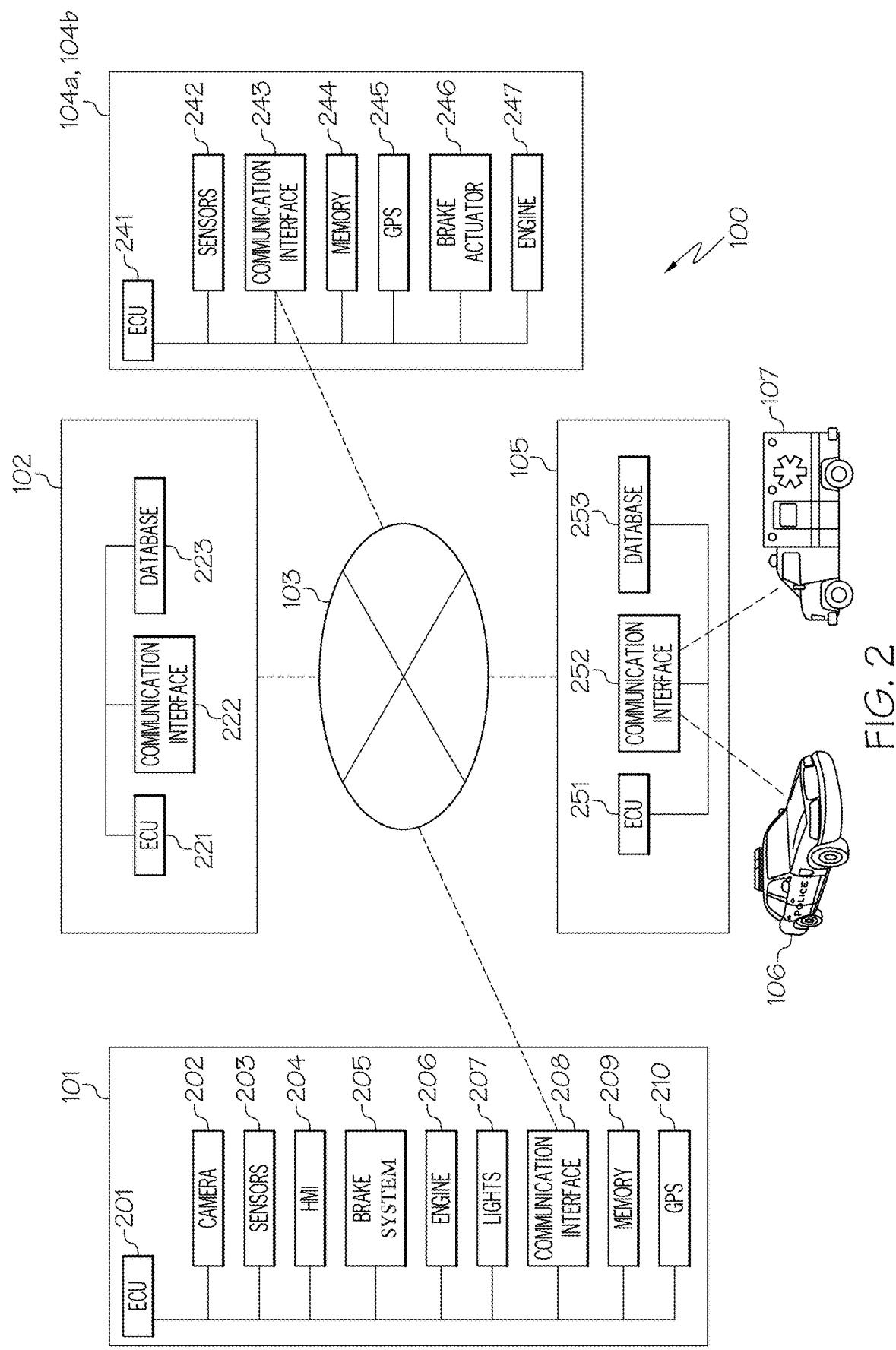
FIG. 2 depicts a schematic diagram of an example system for monitoring driving behavior of a vehicle, according to one or more embodiments shown and described herein.

Referring now to FIG. 2, a schematic diagram of an example system 100 is depicted. In particular, the system 100 may include the vehicle 101, the other vehicles 104*a* and 104*b*, the first server 102, the second server 105, a police vehicle 106, and an ambulance 107. The vehicle 101, the other vehicles 104*a* and 104*b*, the first server 102, and the second server 105 may be connected via varying forms of communication methods 103 (e.g., internet lines, telephone lines).

The vehicle 101 may include an electronic control unit (ECU) 201, a camera 202, sensors 203, a human-machine interface (HMI) 204, a brake system 205, an engine system 206, lights 207, a communication interface 208, memory 209, and GPS 210. The ECU 201, the camera 202, the sensors 203, the HMI 204, the brake system 205, the engine system 206, the lights 207, the communication interface 208, the memory 209, and the GPS 210 are connected by a communication path. The camera 202 can capture images of a driver. The ECU 201 can identify who the driver is based on the images. In the memory 209, a date and a time of driving the vehicle 101, a type of the identified driver of the vehicle 101, criminal history of the identified driver of the vehicle, a type of the vehicle 101, and geographical location which is obtained from the GPS 210 may be stored. The type of the identified driver includes at least one of the driver's age, sex, and marital status. The sensors 203 can obtain values, which are related to driving operations of the vehicle 101, from the brake system 205 or the engine system 206. The values include at least one of an acceleration pedal angle, an angular velocity, a brake pedal pressure, and a brake wheel pressure of the vehicle. The vehicle 101 can send first information which includes the values related to operations including an average acceleration pedal angle, an average angular velocity, an average brake pedal pressure, an average brake wheel pressure of the vehicles, a maximum acceleration pedal angle, a maximum angular velocity, a maximum brake pedal pressure, a maximum brake wheel pressure of the vehicles, a minimum acceleration pedal angle, a minimum angular velocity, a minimum brake pedal pressure or a minimum brake wheel pressure of the vehicles, and the type of the vehicle 101 or the geographical location of the vehicle 101 to the first server 102 via the communication interface 208. Moreover, the vehicle 101 can receive an instruction from the first server 102 via the communication interface 208. Instead of storing in the memory 209, the type of the identified driver of the vehicle 101 and the criminal history of the identified driver of the vehicle 101 may be stored in the first server 102. The vehicle 101 may request the type of the identified driver of the vehicle 101 and the criminal history of the identified driver of the vehicle 101 to the first server 102 based on the identification of the driver, and may receive the type of the identified driver of the vehicle 101 and the criminal history of the identified driver of the vehicle 101 from the first server 102.

Each of the other vehicles 104*a* and 104*b* may include an ECU 241, sensors 242, a communication interface 243, memory 244, GPS 245, a brake system 246, and an engine system 247. The ECU 241, the sensors 242, the communication interface 243, the memory 244, the GPS 245, the brake system 246, and the engine system 247 are connected by a communication path. In the memory 244, a type of each of the other vehicles 104*a* and 104*b* and geographical location which is obtained from the GPS 245 may be stored. The sensors 242 can obtain values, which are related to driving operations of the other vehicles 104*a* and 104*b*, from the brake system 246 or the engine system 247. The values include at least one of an acceleration pedal angle, an angular velocity, a brake pedal pressure, and a brake wheel pressure of the vehicle. The other vehicles 104*a* and 104*b* can send second information which includes the values of operations including an average acceleration pedal angle, an average angular velocity, an average brake pedal pressure, an average brake wheel pressure of the vehicles, a maximum acceleration pedal angle, a maximum angular velocity, a maximum brake pedal pressure, a maximum brake wheel pressure of the vehicles, a minimum acceleration pedal angle, a minimum angular velocity, a minimum brake pedal pressure or a minimum brake wheel pressure of the vehicle, and the types of the other vehicles 104*a* and 104*b* or the geographical locations of the other vehicles 104*a* and 104*b* to the first server 102 via the communication interface 243.

The first server 102 may include ECU 221, a communication interface 222, and a database 223. The ECU 221, the communication interface 222, and the database 223 are connected by a communication path. The first server 102 receives the first information and the vehicle type of the vehicle 101 or the geographical location of the vehicle 101 via the communication interface 222. The first server 102 receives the second information and the vehicle types of the vehicles 104*a* and 104*b* or the geographical locations of the other vehicles 104*a* and 104*b* via the communication interface 222. After receiving the various information, the various information may be stored in the database 223. Moreover, based on the information in the database 223, the ECU 221 may perform various calculations. As discussed in greater detail herein, the various calculations may include detecting whether there is a difference between the first information and the second information. The result of these various calculations may be sent to the vehicle 101, or the second server 105 via the communication interface 222. This is advantageous for off-load processing of comparing the first information and the second information by the first server 102 rather than by the vehicle 101 and/or the other vehicles 104*a* and 104*b*.

The second server 105 may include ECU 251, a communication interface 252, and a database 253. The ECU 251, the communication interface 252, and the database 253 are connected by a communication path. The second server 105 receives the instruction via the communication interface 252 from the first server 102. The database 253 stores the geographical location of the police vehicle 106, and the ambulance 107. The second server 105 selects the police vehicle 106, and the ambulance 107 based on geographical location of the police vehicle 106 and the ambulance 107 and instructs the selected police vehicle 106, and the selected ambulance 107 to go to the vehicle 101 via the communication interface 252. The criteria of the selection is that the distance between the vehicle 101 and the police vehicle 106 or the ambulance 107 is smaller than a predetermined distance. Instead of the distance, the criteria of the selection may be that the time when the police vehicle 106 or the ambulance 107 arrives at the vehicle 101 is smaller than a predetermined time.

Accordingly, the communication path may be formed from any medium that is capable of transmitting a signal such as, e.g., conductive wires, conductive traces, optical waveguides, and the like. In some embodiments, the communication path may facilitate the transmission of wireless signals, such as Wi-Fi, Bluetooth®, Near-Field Communication (NFC), and the like. Moreover, the communication path may be formed from a combination of mediums capable of transmitting signals. In one embodiment, the communication path includes a combination of conductive traces, conductive wires, connectors, and buses that cooperate to permit the transmission of electrical data signals to components such as processors, memories, sensors, input devices, output devices, and communication devices. Accordingly, the communication path may include a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 209, 244, or database 223, 253 may contain one or more memory modules including RAM, ROM, flash memories, hard drives, or any device capable of storing machine readable and executable instructions such that the machine readable and executable instructions can be accessed by the ECU 201, 221, 241, 251. The machine readable and executable instructions may include logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine readable and executable instructions and stored on the memory 209, 244, or database 223, 253. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Figure 3:
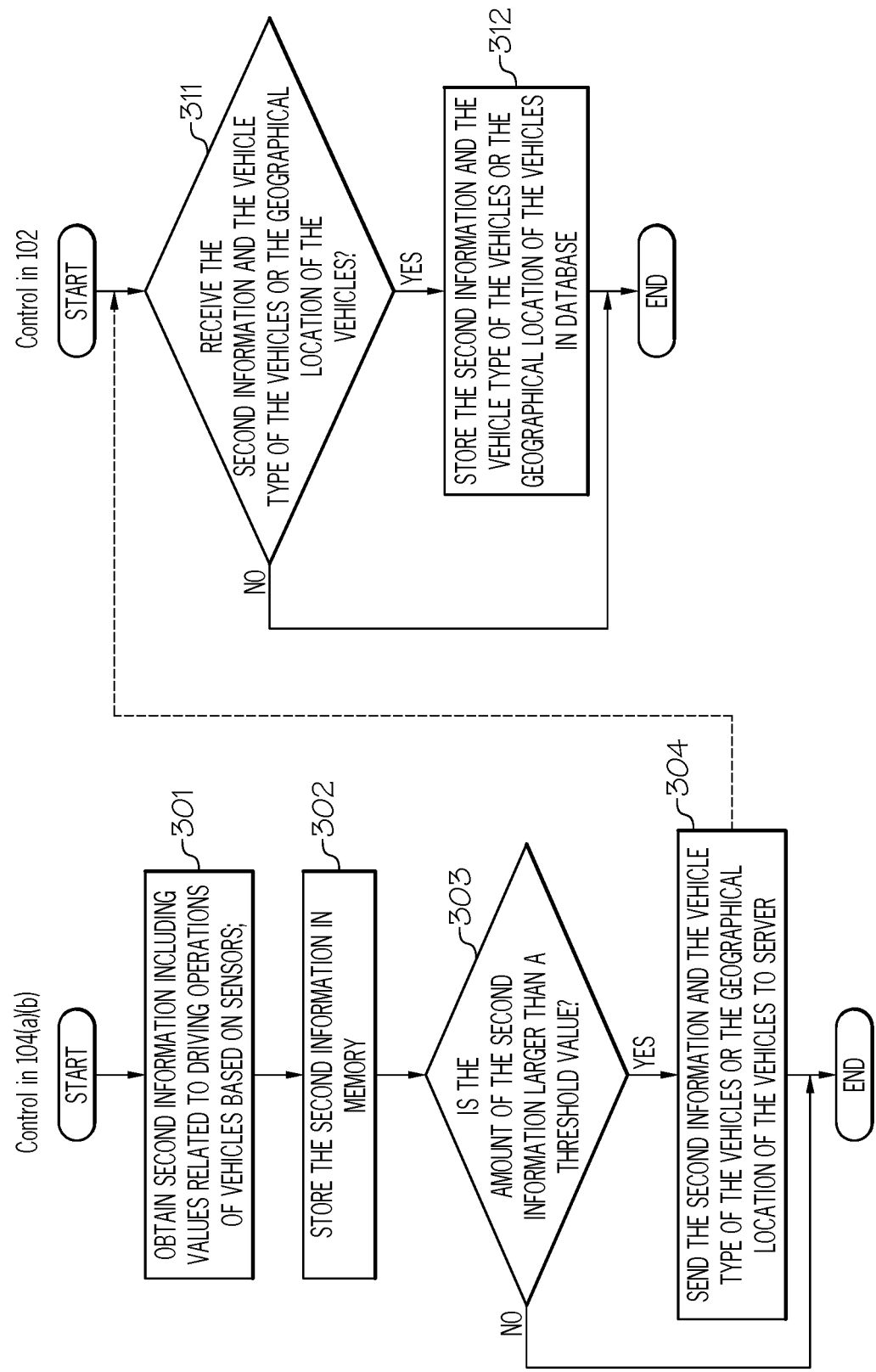
FIG. 3 depicts a flowchart of an example method for storing driving information of vehicles and vehicle types of the vehicles or geographical locations of the vehicles in a database, according to one or more embodiments shown and described herein.

Referring now to FIG. 3, a flowchart of storing second information including values related to driving operations of other vehicles 104*a* and 104*b* and the vehicle type of the other vehicles 104*a* and 104*b* or the geographical location of the vehicles 104*a* and 104*b* in database 223 is depicted, according to embodiments. The flowchart may be conducted by at least one of the ECU 221 and 241. At step 301, the second information is obtained from the sensors 242.

At step 302, the second information is stored in the memory 244. At step 303, whether the amount of the second information is larger than a threshold value or not may be determined. If the amount of the second information is larger than the threshold value, then the process proceeds to step 304.

At step 304, the second information and the vehicle types of the other vehicles 104*a* and 104*b* or the geographical location of the other vehicles 104*a* and 104*b*, which are stored in the memory 244, are sent to the first server 102. Although it is possible for the vehicle to send second information to the first server 102 as soon as the second information is obtained, if the vehicle sends the second information to the first server 102 as soon as the second information is obtained, the number of communications between the vehicle and the first server 102 increases. Thus, the number of transmissions can be reduced if the vehicle sends aggregated second information after the amount of the aggregated second information is larger than the threshold. There are various criteria of the threshold. One example is predetermined data capacity (e.g., 100 gigabytes, 1 terabyte). As other example, it is also conceivable to collectively send data obtained within a predetermined period. One example of the predetermined period is 5 minutes. Another example of the predetermined period is one trip (from ignition-on to ignition-off).

At step 311, whether the first server 102 receives the second information and the vehicle types of the other vehicles 104*a* and 104*b* or the geographical locations of the other vehicles 104*a* and 104*b* or not may be determined. If the first server 102 receives the second information and the vehicle types of the other vehicles 104*a* and 104*b* or the geographical locations of the other vehicles 104*a* and 104*b*, then the process proceeds to step 312.

At step 312, the second information and the vehicle types of the other vehicles 104*a* and 104*b* or the geographical locations of the other vehicles 104*a* and 104*b* may be stored in the database 223.

Figure 4:
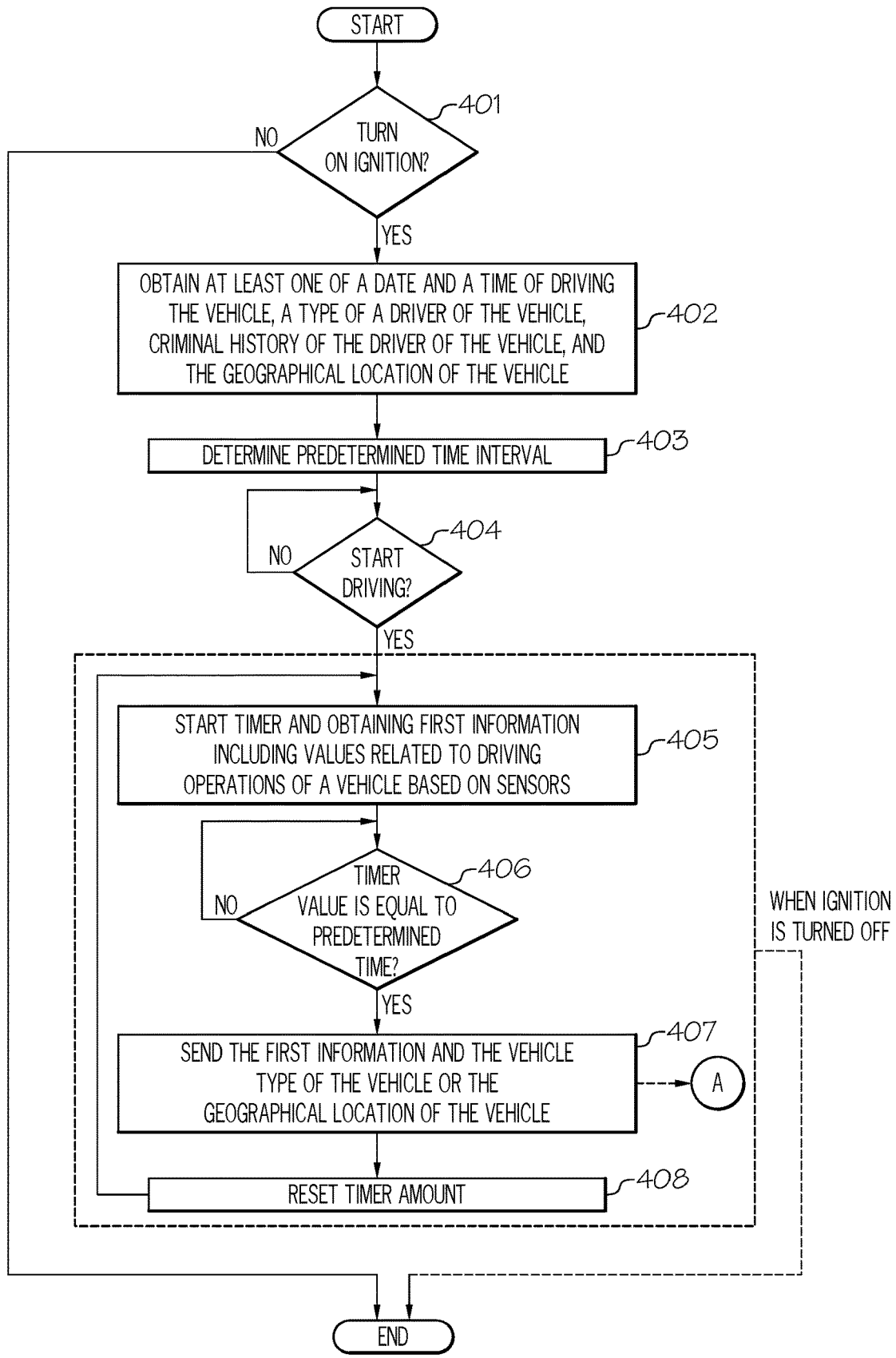
FIG. 4 depicts a flowchart of an example method for obtaining and sending driving information of a vehicle and a vehicle type of the vehicle or a geographical location of the vehicle, according to one or more embodiments shown and described herein.

Referring now to FIG. 4, a flowchart of an example obtaining the first information and the vehicle type of the vehicle 101 or the geographical location of the vehicle 101 and sending the first information and the vehicle type of the vehicle 101 or the geographical location of the vehicle 101 is depicted, according to embodiments. The flowchart may be conducted by at least one of the ECU 201 in FIG. 2.

At step 401, whether ignition of a vehicle is turned on or not may be determined. If the ignition is turned on, then the process proceeds to step 402.

At step 402, at least one of a date and a time of driving the vehicle 101, the type of a driver of the vehicle 101, the criminal history of the driver of the vehicle 101, and the geographical location of the vehicle 101 are obtained and then the process proceeds to step 403.

At step 403, a predetermined time interval is determined based on at least one of the date and the time of driving the vehicle, the type of a driver of the vehicle 101, the criminal history of the driver of the vehicle 101, and the geographical location of the vehicle 101. The predetermined time interval is used later in step 406. The predetermined time interval is used to set how frequently the driving behavior of the vehicle should be tested. There are various examples about how to determine the predetermined time interval. The more likely the driver is to drink alcohol, the smaller the predetermined time interval should be. For example, because the driver is more likely to drink alcohol on Friday than on Monday, the predetermined time interval on Friday is smaller than that on Monday. Other example, because the driver is more likely to drink alcohol at night than in the morning, the predetermined time interval at night is smaller than that in the morning. The predetermined time interval of one gender may be smaller than that of the other gender. Because a person who is over 20 years old is more likely to drink alcohol than a person whose age is 18~20, the predetermined time interval of a person who is over 20 years old is smaller than a person whose age is 18~20. Because a person who is not married or does not a child is more likely to drink alcohol and drive a vehicle than a person who is married or has a child, the predetermined time interval of a person who is not married or does not have a child is smaller than a person who is married or has a child. Because a person who is located in downtown is more likely to drink alcohol and drive a vehicle than a person who is not in downtown, the predetermined time interval of a person who is in downtown is smaller than a person who is not in downtown. Because a person who has committed a crime is more likely to drink alcohol and drive a vehicle than a person who has never committed a crime, the predetermined time interval of a person who has committed a crime is smaller than a person who has never committed a crime.

At step 404, whether driving starts or not may be determined. If driving starts, then the process proceeds to step 405.

At step 405, a timer starts and first information including values related to driving operations of the vehicle is collected from the vehicle. The first information includes, but not limited to, the values related to operations including an average acceleration pedal angle, an average angular velocity, an average brake pedal pressure, an average brake wheel pressure of the vehicle, a maximum acceleration pedal angle, a maximum angular velocity, a maximum brake pedal pressure, a maximum brake wheel pressure of the vehicles, a minimum acceleration pedal angle, a minimum angular velocity, a minimum brake pedal pressure, or a minimum brake wheel pressure of the vehicle.

At step 406, whether the timer value is equal to the predetermined time interval or not may be determined. If it is determined that the timer value is equal to the predetermined time interval, then the process proceeds to step 407.

At step 407, the first information and the vehicle type of the vehicle or the geographical location of the vehicle are sent to the first server 102, and then the process proceeds to step 408. At step 408, the timer is reset, then the process proceeds to step 405.

If the ignition is turned off when the process is in between step 405 and step 408, the process is forcibly shut down.

Figure 5:
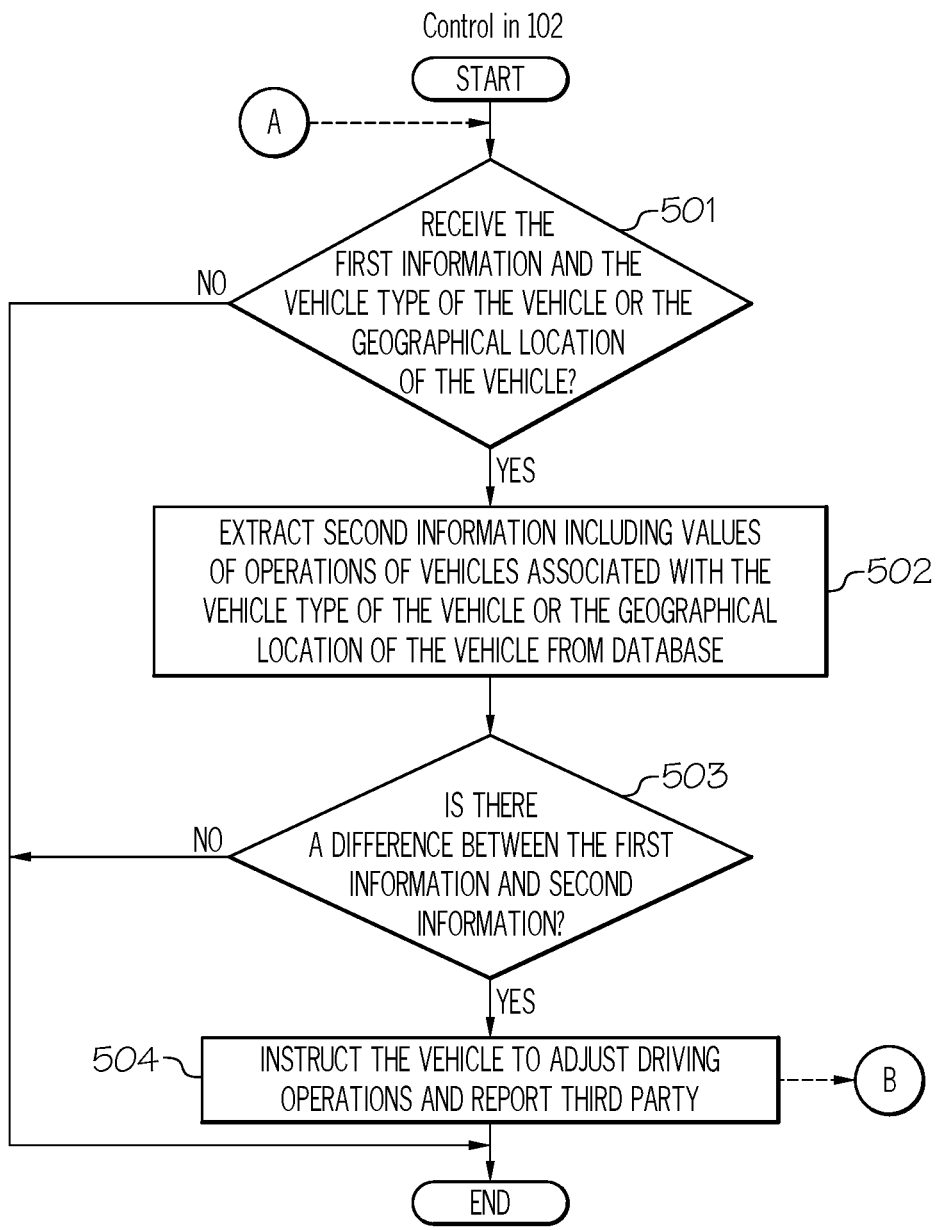
FIG. 5 depicts a flowchart of an example method for comparing driving information of a vehicle and driving information of other vehicles, according to one or more embodiments shown and described herein.

Referring now to FIG. 5, a flowchart of an example detecting a difference between the first information and the second information is depicted, according to embodiments. The flowchart may be conducted by at least one of the ECU 221 in the first server 102.

At step 501, it is determined whether the first server 102 received the first information and the vehicle type of the vehicle 101 or the geographical location of the vehicle 101. If the first server 102 received the first information and the vehicle type of the vehicle 101 or the geographical location of the vehicle 101, then the process proceeds to step 502. If the first server 102 did not receive the first information and the vehicle type of the vehicle 101 or the geographical location of the vehicle 101, then the process ends.

At step 502, the second information including values related to operations of the other vehicles 104a and 104b associated with the vehicle type of the vehicle 101 or the geographical location of the vehicle 101 from the database 223 is extracted from the database 223. The criteria for determining whether the second information is associated with the vehicle type of the vehicle 101 or the geographical location of the vehicle 101 or not are whether or not the types of the other vehicles 104a and 104b are the same as the type of the vehicle 101, or whether or not the geographical locations of the other vehicles 104a and 104b are close to the geographical location of the vehicle 101. More specifically, the criteria for determining whether the second information is associated or not are whether the other vehicles 104a and 104b are located within a predetermined area which includes the geographical location of the vehicle 101.

At step 503, the ECU 221 determines whether there is a difference between the first information and the second information. If the ECU 221 determines that there is the difference between the first information and the second information, then the process proceeds to step 504. In embodiment, the ECU 221 compares the first information of the vehicle 101 with the second information that is obtained from vehicles that were driving in the same geographical location of the vehicle 101. Specifically, if the first information is generated while the vehicle 101 is driving in a state of Ohio, a certain city, or a certain road, the ECU 221 extracts the second information of vehicles that is generated while the vehicles were driving in the state of Ohio, the certain city, or the certain road and compares the first information with the extracted second information. For example, the ECU 221 may determine whether a difference between an acceleration pedal angle of the vehicle 101 and an average acceleration pedal angle of the vehicles that were driving in the same geographical location as the vehicle 101 is greater than a threshold value. If the difference is greater than the threshold, then the ECU determines that there is a difference between the first information and the second information. As another example, the ECU 221 may determine whether a difference between an angular velocity of the vehicle 101 and an average angular velocity of the vehicles that were driving in the same geographical location as the vehicle 101 is greater than a threshold value. If the difference is greater than the threshold, then the ECU determines that there is a difference between the first information and the second information. As another example, the ECU 221 may determine whether a difference between the acceleration pedal angle of the vehicle 101 and the maximum acceleration pedal angle of the vehicles that were driving in the same geographical location as the vehicle 101 is greater than a threshold value. If the difference is greater than the threshold, then the ECU determines that there is a difference between the first information and the second information.

As another example, the ECU 221 may determine whether a difference between the maximum acceleration pedal angle of the vehicle 101 and the maximum acceleration pedal angle of the vehicles that were driving in the same geographical location as the vehicle 101 is greater than a threshold value. If the difference is greater than the threshold, then the ECU determines that there is a difference between the first information and the second information. As another example, the ECU 221 may determine whether a difference between the minimum acceleration pedal angle of the vehicle 101 and the minimum acceleration pedal angle of the vehicles that were driving in the same geographical location as the vehicle 101 is greater than a threshold value. If the difference is greater than the threshold, then the ECU determines that there is a difference between the first information and the second information. As another example, the ECU 221 may determine whether a difference between the average (or maximum or minimum) amount of the change of an acceleration pedal angle of the vehicle 101 and the average (or maximum or minimum) amount of the change of an acceleration pedal angle of the vehicles that were driving in the same geographical location as the vehicle 101 is greater than a threshold value. The change of acceleration pedal angle may be, for example, a differential value of the acceleration pedal angle. If the difference is greater than the threshold, then the ECU determines that there is a difference between the first information and the second information.

In embodiments, the ECU 221 compares first information of the vehicle 101 with the second information that is obtained from vehicles whose vehicle type is the same as the vehicle 101. Specifically, if the type of the vehicle 101 is a mid-sized SUV, the ECU uses second information that is obtained from mid-sized SUVs. For example, the ECU 221 may determine whether a difference between an acceleration pedal angle of the vehicle 101 and an average acceleration pedal angle of the vehicles whose vehicle type is the same as the vehicle 101 is greater than a threshold value. If the difference is greater than the threshold, then the ECU determines that there is a difference between the first information and the second information. As another example, the ECU 221 may determine whether a difference between an angular velocity of the vehicle 101 and an average angular velocity of the vehicles whose vehicle type is the same as the vehicle 101 is greater than a threshold value. If the difference is greater than the threshold, then the ECU determines that there is a difference between the first information and the second information. As another example, the ECU 221 may determine whether a difference between the acceleration pedal angle of the vehicle 101 and the maximum acceleration pedal angle of the vehicles whose vehicle type is the same as the vehicle 101 is greater than a threshold value. If the difference is greater than the threshold, then the ECU determines that there is a difference between the first information and the second information.

In embodiments, the ECU 221 compares the first information of the vehicle 101 with the second information that is generated at a similar time as when the first information of the vehicle 101 is obtained. Specifically, if the first information of the vehicle 101 is generated during weekdays, the ECU 221 extracts the second information that were generated during weekdays and compares the first information with the second information. If the first information of the vehicle 101 is generated around midnight, the ECU 221 extracts the second information that were generated around midnight and compares the first information with the second information. If the first information of the vehicle 101 is generated during holidays, the ECU 221 extracts the second information that were generated during holidays and compares the first information with the second information.

In embodiments, the ECU 221 may compare two or more values of the first information with two or more values of the second information. For example, the ECU 221 may determine whether a first difference between an acceleration pedal angle of the vehicle 101 and an average acceleration pedal angle of the vehicles that were driving in the same geographical location as the vehicle 101 is greater than a first threshold value and determine whether a second difference between an angular velocity of the vehicle 101 and an average angular velocity of the vehicles that were driving in the same geographical location as the vehicle 101 is greater than a second threshold value. If the first difference is greater than the first threshold and the second difference is greater than the second threshold, then the ECU determines that there is a difference between the first information and the second information.

If the ECU 221 determines that the difference between the first information and the second information is not greater than a threshold value, then the process ends.

In some embodiments, the ECU 221 may increment a counter if it is determined that a difference between a value of the vehicle 101 and a value of other vehicles is greater than a threshold. For example, the ECU 221 may increment a counter if the difference between an acceleration pedal angle of the vehicle 101 and an average acceleration pedal angle of the vehicles that were driving in the same geographical location as the vehicle 101 is greater than a threshold value. Then, the ECU determines whether the counter value is greater than a threshold counter value. If it is determined that the counter value is greater than the threshold counter value, the ECU 221 determines that there is a difference between the first information and the second information and then the process proceeds to step 504. If it is determined that the counter value is not greater than the threshold counter value, the process returns to the starting point, and repeats the process with new first information that is received from the vehicle 101.

At step 504, the ECU 221 instructs the vehicle 101 to adjust driving operations and reports to a third party. The instruction includes a signal which instructs the vehicle 101 to output an alert on the HMI 204 of the vehicle 101, turn on the lights 207 of the vehicle 101, brake the vehicle 101, limit an accelerator of the vehicle 101, or stop the vehicle 101. The lights 207 may include hazard lights. The third party may include the second server 105, the police vehicle 106, and the ambulance 107. The third party may include only the second server 105. When the second server 105 receives the report, the second server 105 searches for the police vehicle 106 and the ambulance 107 which are close to the vehicle 101, and instructs the police vehicle 106, and the ambulance 107 to go to the vehicle 101.

Figure 6:
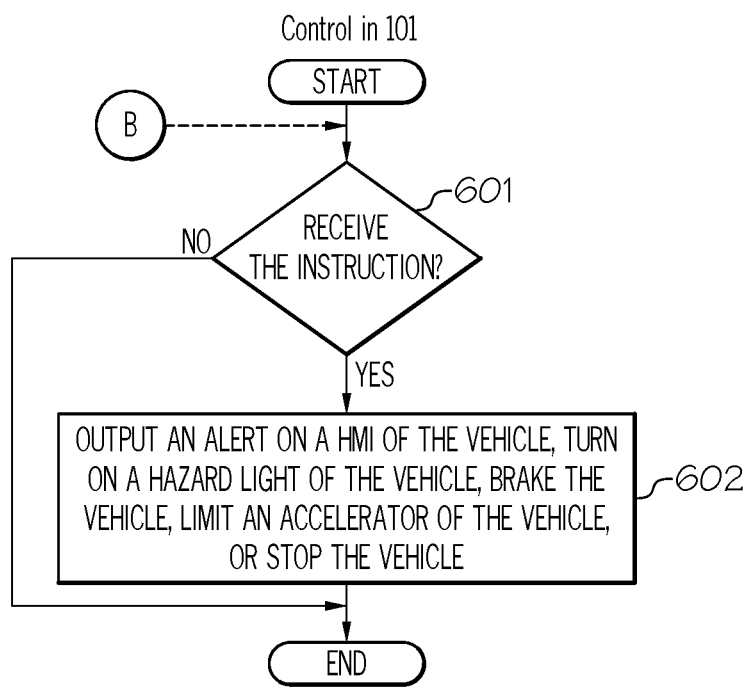
FIG. 6 depicts a flowchart of an example method about what the vehicle does after receiving an instruction from a server, according to one or more embodiments shown and described herein.

Referring now to FIG. 6, a flowchart of an example that shows the operations of the vehicle 101 after receiving instructions from a server is depicted, according to embodiments. The flowchart may be conducted by at least one of the ECU 201 in the vehicle 101.

At step 601, it is determined whether the ECU 201 received instruction from a server or not. If the vehicle 101 received the instruction from the server, then the process proceeds to step 602.

At step 602, the ECU 201 may output the alert on the HMI 204 of the vehicle 101, turn on the lights 207 of the vehicle 101, brake the vehicle 101, limit an accelerator of the vehicle 101, or stop the vehicle 101 according to the instruction from the server.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for monitoring driving behavior of a vehicle, the method comprising:
    obtaining first information including values related to driving operations of a vehicle based on sensors;
    obtaining a geographical location or a vehicle type of the vehicle;
    extracting second information including values of operations of vehicles associated with the vehicle type of the vehicle or the geographical location of the vehicle;
    determining whether there is a difference between the first information and the second information; and
    instructing the vehicle to adjust driving operations in response to determining that there is the difference between the first information and the second information,
    wherein:
    the determining of whether there is the difference between the first information and the second information is repeatedly performed at a frequency, wherein the frequency is based on a predetermined time interval, and
    the predetermined time interval is adjusted based on at least one of a date and a time of driving the vehicle, a type of a driver of the vehicle, criminal history of the driver of the vehicle, and the geographical location of the vehicle.

2. The method according to claim 1, further comprising:
    in response to determining that there is the difference between the first information and the second information, transmitting a signal to the vehicle, wherein the signal instructs the vehicle to output an alert on a human-machine interface (HMI) of the vehicle, turn on a hazard light of the vehicle, brake the vehicle, limit an accelerator of the vehicle, or stop the vehicle.

3. The method according to claim 1, wherein the values related to driving operations of the vehicle include at least one of an acceleration pedal angle, an angular velocity, a brake pedal pressure, and a brake wheel pressure of the vehicle, and the values of operations of the vehicles include an average acceleration pedal angle, an average angular velocity, an average brake pedal pressure, an average brake wheel pressure of the vehicles, a maximum acceleration pedal angle, a maximum angular velocity, a maximum brake pedal pressure, a maximum brake wheel pressure of the vehicles, a minimum acceleration pedal angle, a minimum angular velocity, a minimum brake pedal pressure or a minimum brake wheel pressure of the vehicles.

4. The method according to claim 1, further comprising:
storing the first information as abnormal driving information in response to determining that the difference between the first information and second information is greater than a threshold value.

5. The method according to claim 1, further comprising:
in response to determining that there is the difference between the first information and the second information, reporting to a third party.

6. The method according to claim 1, wherein the values of operations of the vehicles are values obtained from the vehicles located within a predetermined area which includes the geographical location of the vehicle.

7. The method according to claim 1, wherein the values of operations of the vehicles are values obtained from the vehicles whose types correspond to the vehicle type of the vehicle.

8. The method according to claim 1, wherein:
obtaining first information including values related to driving operations of the vehicle is repeatedly performed with the predetermined time interval.

9. The method according to claim 1 wherein:
the driver type includes at least one of the driver's age, sex, and marital status.

10. The method according to claim 1, further comprising:
incrementing a counter based on a comparison of one or more of the values related to driving operations of the vehicle and one or more of the values of the operations of the vehicles; and
determining that there is the difference between the first information and the second information in response to determining that the counter is greater than a threshold value.

11. A system for monitoring driving behavior of a vehicle, comprising:
a controller configured to:
obtain first information including values related to driving operations of a vehicle based on sensors;
obtain a geographical location or a vehicle type of the vehicle;
extract second information including values of operations of vehicles associated with the vehicle type of the vehicle or the geographical location of the vehicle;
determine whether there is a difference between the first information and the second information;
report to a third party in response to determining that there is the difference between the first information and the second information; and
instruct the vehicle to adjust driving operations in response to determining that there is the difference between the first information and the second information, wherein:
to determine whether there is the difference between the first information and the second information is repeatedly performed at a frequency, wherein the frequency is based on a predetermined time interval, and
the predetermined time interval is adjusted based on at least one of a date and a time of driving the vehicle, a type of a driver of the vehicle, criminal history of the driver of the vehicle, and the geographical location of the vehicle.

12. The system according to claim 11, wherein the controller is further configured to:
in response to determining that there is the difference between the first information and the second information, transmit a signal to the vehicle, wherein the signal instructs the vehicle to output an alert on a HMI of the vehicle, turn on a hazard light of the vehicle, brake the vehicle, limit an accelerator of the vehicle, or stop the vehicle.

13. The system according to claim 11, wherein the values related to driving operations of the vehicle include at least one of an acceleration pedal angle, an angular velocity, a brake pedal pressure, and a brake wheel pressure of the vehicle, and the values of operations of the vehicles include an average acceleration pedal angle, an average angular velocity, an average brake pedal pressure, an average brake wheel pressure of the vehicles, a maximum acceleration pedal angle, a maximum angular velocity, a maximum brake pedal pressure, a maximum brake wheel pressure of the vehicles, a minimum acceleration pedal angle, a minimum angular velocity, a minimum brake pedal pressure or a minimum brake wheel pressure of the vehicles.

14. The system according to claim 11, wherein the values of operations of the vehicles are values obtained from the vehicles located within a predetermined area which includes the geographical location of the vehicle.

15. The system according to claim 11, wherein the values of operations of the vehicles are values obtained from the vehicles whose types correspond to the vehicle type of the vehicle.

16. A non-transitory computer readable medium storing instructions, when executed by a processor, causing a system to:
obtain first information including values related to driving operations of a vehicle based on sensors;
obtain a geographical location or a vehicle type of the vehicle;
extract second information including values of operations of vehicles associated with the vehicle type of the vehicle or the geographical location of the vehicle;
determine whether there is a difference between the first information and the second information; and
instruct the vehicle to adjust driving operations in response to determining that there is the difference between the first information and the second information, wherein:
to determine whether there is the difference between the first information and the second information is repeatedly performed at a frequency, wherein the frequency is based on a predetermined time interval, and the predetermined time interval is adjusted based on at least one of a date and a time of driving the vehicle, a type of a driver of the vehicle, criminal history of the driver of the vehicle, and the geographical location of the vehicle.

17. The method according to claim 1, wherein:
the predetermined time interval at night is set smaller than the predetermined time interval in the morning.

18. The method according to claim 1, wherein:
the predetermined time interval during weekends is set smaller than the predetermined time interval during weekdays.

\* \* \* \* \*